July 8, 1952 — A. P. GLENNY — 2,602,611
AUTOMATIC PILOT FOR AIRCRAFT
Filed Jan. 12, 1948 — 2 SHEETS—SHEET 1

Inventor
ARTHUR P. GLENNY
By Herbert H. Thompson
his Attorney

July 8, 1952  A. P. GLENNY  2,602,611
AUTOMATIC PILOT FOR AIRCRAFT
Filed Jan. 12, 1948  2 SHEETS—SHEET 2
FIG 2
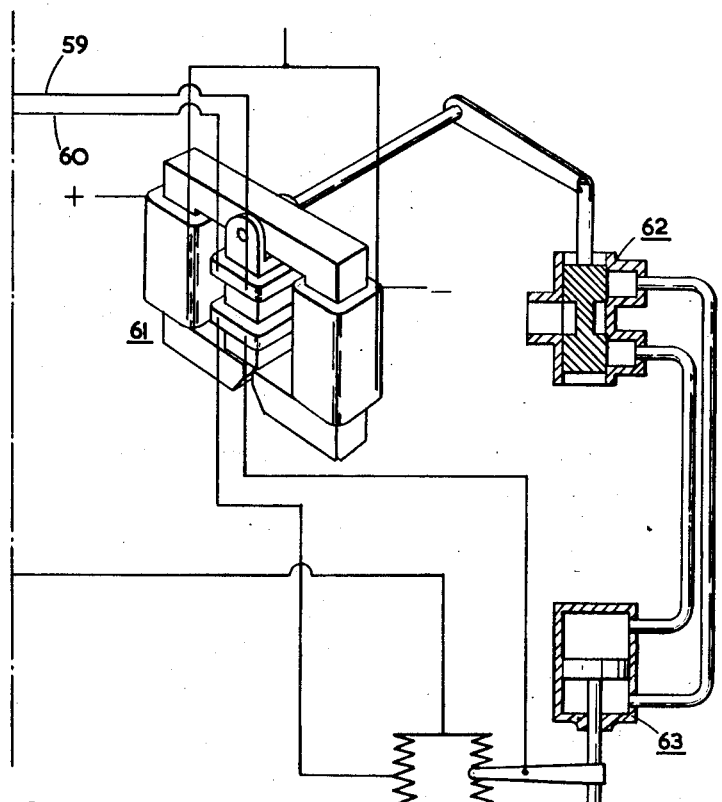
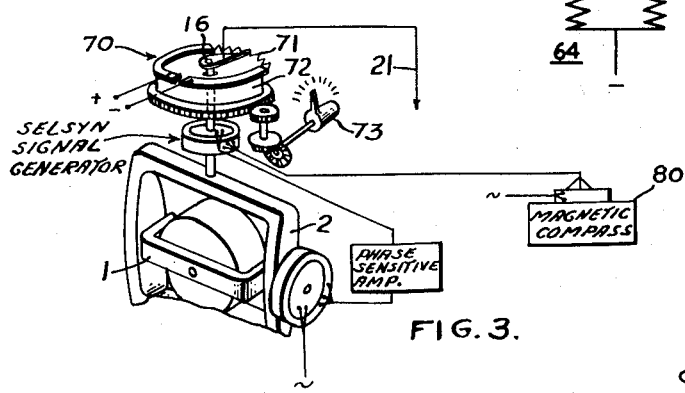
FIG. 3.
Inventor
ARTHUR P. GLENNY
By Herbert P. Thompson
his Attorney.

Patented July 8, 1952

2,602,611

UNITED STATES PATENT OFFICE 2,602,611

AUTOMATIC PILOT FOR AIRCRAFT

Arthur Philip Glenny, Hanworth, England, assignor to The Sperry Corporation, a corporation of Delaware Application January 12, 1948, Serial No. 1,737
In Great Britain January 15, 1947

24 Claims. (Cl. 244—77)

The present invention relates to automatic pilots for aircraft and has for its principal object the provision of simplified and cheap apparatus of this kind in which a novel method of controlling turn of an aircraft being operated under its control is employed.

Automatic pilots usually comprise direction-determining instruments for measuring angular displacements of a craft about its yaw, roll and pitch axes relative to a predetermined course and a horizontal plane, pick-off devices co-operating with the direction-determining instruments for providing control signals dependent on the measurements of such displacements and servo-motors controlled by these signals and coupled to control surfaces of the craft appropriate to change the heading, roll, and pitch in such a way as to correct any deviations from the normal. These direction-determining instruments are frequently gyroscopes and the pick-off devices usually comprise two co-operating members one fixed to, or otherwise controlled in position by, a gimbal-frame of a gyroscope and the other settably located with respect to the gyroscope case, and hence with respect to the craft. When such automatic pilots are in operation and it is desired to change the heading of the craft, it is usual manually to alter the relative position of the two members of the appropriate pick-off device, e. g., either by forcibly turning the gyroscope so that its spin axis takes up a new direction in space or by turning the settable pick-off member relatively to the craft by an amount corresponding to the angle through which it is desired to change the heading of the craft. The pick-off device is thus caused to produce a signal which controls the appropriate servo-motor and hence its associated control surface so as to turn the craft to restore the original relationship between the two members of the pick-off device. In this way the craft is turned through the desired change of heading.

It is desirable, when a turn is being carried out through an automatic pilot, that the rate of turn should not be excessive. Various expedients have been adopted in previous types of automatic pilots with this object in view. The most commonly applied method involves the use of a course-changing motor which is manually set into operation and which alters the set heading by displacing the settable member of the pick-off relatively to the craft at a constant rate. Another method employed in some cases where a direction-gyroscope constitutes the direction-determining instrument is to apply a constant torque to the gyroscope to precess it at a constant rate. With both of these methods the rate of turn of the craft, rather than the amount of turn, is the quantity that is primarily set into the automatic pilot and the angle turned through has to be determined by a further operation.

The principal object of the present invention is to provide an automatic control system for aircraft in which it is possible to set the angle through which it is desired to change the craft's heading directly and in which a correctly banked turn to a new heading set is carried out automatically at a rate not exceeding a predetermined limiting rate. The limiting rate may be rendered adjustable over a range of possible values.

According to the present invention automatic control apparatus for aircraft is provided in which the servo-motor actuating the roll-controlling surfaces or ailerons is controlled from a resultant signal having as components a heading-departure control-signal furnished by a direction-determining instrument with a co-operating pick-off device and applied in the sense to cause the craft to bank and turn towards a predetermined heading on departure therefrom and a bank-angle control signal furnished by a bank-angle-determining instrument with a co-operating pick-off device and applied in the sense to eliminate banking of the craft, and in which means is provided for setting the predetermined heading by or in relation to the direction-determining instrument, characterised in that the heading-departure control-signal increases progressively with departure of the craft's heading from the predetermined set heading up to a predetermined limit, but remains substantially constant for departure in excess of the predetermined limit up to substantially 180°.

The resultant signal for actuating the ailerons may also include a resetting or balancing signal developed in dependence on the extent of movement of the servo-motor and hence of the ailerons, the object of which is to limit the movement of the ailerons to an angle dependent on the sum of the control signals provided by the controlling instruments.

When an automatic pilot according to the invention is in use and a change of heading is set by or in relation to the direction-determining instrument, a heading-departure control-signal is generated in dependence on the deviation of the heading of the aircraft then obtaining from the heading set, with the result that the ailerons are actuated and the craft begins to roll, or bank, and consequently to turn. The roll ceases to increase when the resultant signal controlling the aileron servo-motors is zero. This will occur at an angle of bank determined by the heading-departure control-signal and, as the latter is limited in accordance with the invention, the angle of bank and therefore the rate of turn of the craft to the set heading will also be limited.

One embodiment of an automatic pilot according to the invention will now be described by way of example with reference to the accompanying drawings in which Fig. 1 illustrates the automatic control arrangements for the ailerons of an aircraft and includes a gyro-vertical which, as well as measuring angular displacement of the craft about the roll axis, also measures angular displacement about the pitch axis.

Fig. 2 illustrates the pitch-controlling arrangement associated with the gyro-vertical included in Fig. 1.

Fig. 3 illustrates a modified form of directional gyro for setting a new heading without caging and forcibly turning the gyroscope.

Figure 1:
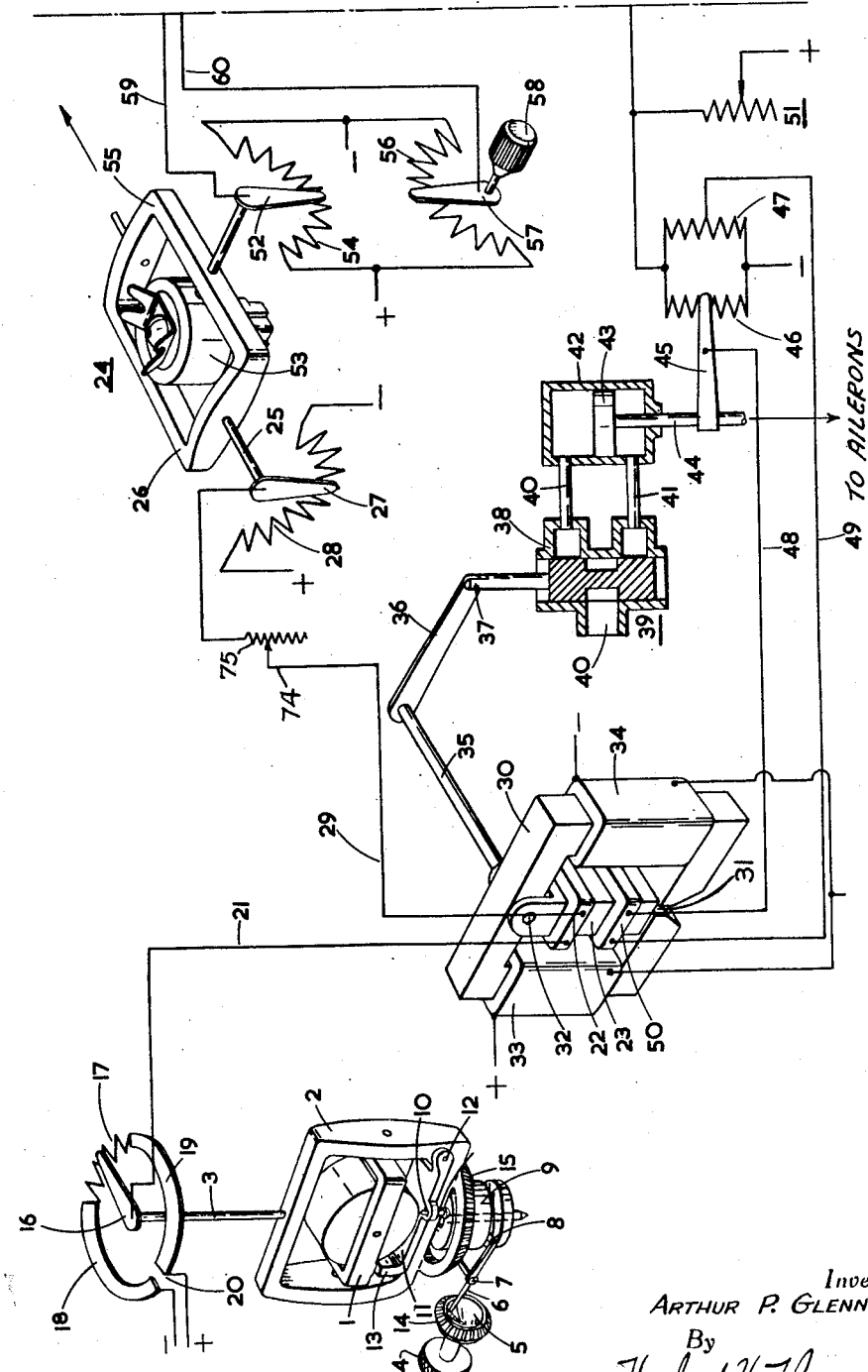

In Fig. 1 a direction gyroscope, with inner and outer gimbal-frames 1 and 2, has the outer gimbal-frame mounted in a case (not shown) for rotation above the axis of the vertical shaft 3; and is provided with caging or locking, and turning means. The caging means comprises a knob 4 arranged for translational movement towards the vertical axis, and having a conical-shaped hollow surface 5, in contact with one end of a horizontal member 6, mounted at pivot 7, for angular movement relative to the case about a horizontal axis, the other end of the member 6 being provided with a pin 8 engaging in a slot in a sleeve 9 mounted for movement along the vertical axis. The upper surface of the sleeve is in contact with a pin 10 whose lower end is normally maintained at a fixed distance from a locking member 11 by a spring (not shown) but which is capable of small movement relative to the locking member against the action of the spring. The locking member 11 is mounted inside the outer gimbal-frame by pivot 12 for angular movement in a vertical plane, and is normally maintained by gravity on the lower part of the gimbal frame; and has a projection 13 at the end remote from the pivot which when the locking member is turned about the pivot engages with and locks the inner gimbal-frame in a horizontal position. The turning means comprises a bevel gear-wheel 14 carried by knob 4 and arranged so that when the knob is pushed inwards towards the vertical axis the bevel gear-wheel 14 engages with a co-operating bevel gear-wheel 15 fixed to the lower part of the outer gimbal-frame. When knob 4 is pushed in and turned it locks the inner gimbal-frame in a horizontal position and turns the outer gimbal-frame about the vertical axis. A detent (not shown) is provided for holding the knob 4 in the pushed-in or locked position until the detent is manually released or overridden. Associated with the vertical shaft is a potentiometer whose wiper 16 is fixed to the shaft and whose winding is mounted on the case. The winding comprises a central portion 17 disposed along the circumference of a circle concentric with the shaft through an angle of 60°, the circle being substantially completed by two similar low-resistance strips 18, 19, connected to the ends of the central portion but whose adjacent ends are insulated from one another by a small gap 20. The adjacent ends of the strip 18, 19, are connected to a source of direct current (not shown); and the heading-departure control-signal is taken from the wiper 16 by line 21 to one end of a first coil 22 located on the armature 23 of a polarised relay.

A gyro-vertical 24 of any known type is mounted on the same base as the directional gyroscope and the base is so mounted in the craft that the major, or outer gimbal-frame, axis of the gyro-vertical lies along the fore-and-aft axis of the craft. A shaft 25 lying along the major axis and fixed to the outer gimbal-frame 26 carries a wiper 27 co-operating with a winding 28 of a second potentiometer, the ends of the winding being connected to a source of direct current (not shown); and the wiper is connected by a line 29 to the other end of the aforesaid first coil 22 on the armature of the polarised relay. This wiper provides the bank-angle control-signal.

The polarised relay is in the form of a rectangular core 30 of magnetic material with a small air gap 31 in the middle of one side, and the armature, which is also of magnetic material, is pivoted at one end on pivot 32 located at the middle of the side of the core opposite to the side containing the gap, the other end of the armature being close to the gap. The sides of the core parallel to the armature are provided with exciting coils 33, 34, connected to a source of direct current (not shown). The armature as well as carrying the first operative coil 22 connected to the wipers of the first and second potentiometers as already described, also carries a second operative coil 50 connected to a third potentiometer providing the feed-back signal. Fixed to the armature for angular movement with it is a shaft 35, provided with an arm 36, connected by a pin 37 to the piston 38 of a pneumatically controlled valve 39 of known type.

Preferably, means are included in the polarising circuit of the relay for causing periodic variations of the exciting current so as to cause small vibrations or "dither" of the armature irrespective of the operative currents supplied to the relay.

Air under pressure is supplied from a source (not shown) to the inlet port 40 of control valve 39 whose outlet ports 40, 41, are connected to the two ends of a pneumatic servo-motor 42, also of known type, to control actuation of piston 43 in well-known manner. The piston 43 has a piston-rod 44, which is connected to control the ailerons by means (not shown). Fixed to the piston-rod 44 for movement with it is the wiper 45, of a third potentiometer whose winding is in the form of two similar resistances 46, 47, connected in parallel to a source (not shown) through a variable resistance 51, the wiper 45 co-operating with the resistance 46. Lines 48, 49, from the wiper and a centre tap of resistance 47, are connected to the second coil 50, located on the armature 23, of the polarised relay. This wiper provides the feed-back signal.

The apparatus above described constitutes the part of the automatic pilot that controls the flight of the craft in azimuth and its attitude about the roll axis; and in order that it may do so it is essential that the several potentiometers and the polarised relay should be correctly connected to their source of energy. The first and second potentiometers must be connected to their source in such a way that banking of the craft resulting from the heading-departure control signal supplied from the first potentiometer will produce a bank-angle control signal in the second potentiometer that will oppose the heading-departure control signal causing the banking; the polarised relay must be connected to its source in such a way that the heading-departure control signal from the first potentiometer will cause the armature to move in the sense appropriate to apply ailerons to cause the craft to bank and turn towards a predetermined heading on departure therefrom; and the third potentiometer must be connected to its source in such a way that the feed-back signal is effective in the second relay coil to oppose the resultant signal supplied by the first and second potentiometers to the first relay coil.

In addition to the above-described apparatus for controlling the craft in azimuth and bank, the automatic pilot is also provided with apparatus for controlling the craft about its pitch axis. For this purpose the vertical gyroscope 24 is provided with a wiper 52, mounted for rotation with the rotor-casing 53 about the inner gimbal-axis, and co-operating with a potentiometer winding 54, mounted on the outer gimbal-frame 55. This winding 55 is connected by flexible lines or sliding contacts (not shown) in parallel with a second similar winding mounted on the case and co-operating with a wiper 57 manually adjustable by knob 58. The two windings are connected in parallel to a source of direct current (not shown) and their output is taken from the two wipers by lines 59, 60, and applied to control actuation of the elevator of the craft by way of a polarised relay 61, Fig. 2, a control valve 62, and a servo-motor 63 provided with a feed-back potentiometer 64, the arrangement being similar to that above described in connection with control of the ailerons.

It follows from the above description that in straight flight the heading and roll of the craft are simultaneously stabilised by the action of the ailerons in response to the resultant signal, if any, supplied by the directional-gyroscope pick-off and the appropriate vertical gyroscope pick-off to the polarised relay controlling the aileron control valve and hence the aileron servo-motor.

When it is desired to turn the craft to a new heading the directional gyroscope is manually caged and turned to the desired heading and is then freed again. This operation also sets the wiper of the associated pick-off at an angle relative to its zero position equal to the desired change in heading, thus causing a heading-departure control signal to be applied to the relay whereupon the craft banks and turns towards the new heading. As a result of banking the bank-angle control-signal pick-off associated with the gyro-vertical provides a further signal which opposes the heading-departure control signal and stops further banking as soon as the bank angle reaches a value determined by the heading-departure control signal and the design of the bank-angle control-signal potentiometer. The bank-angle and therefore the rate of turn of the craft to the set heading will be independent of the set change of course provided that the latter exceeds 30°. No matter how large is the change of heading the heading-departure control signal cannot exceed the voltage developed for a change of heading or departure from heading of 30°, and all turns in excess of 30° are therefore carried out at the same rate. Changes of heading of less than 30° are carried out at lower rates of turn.

When it is desired to execute a continuous turn the direction-gyroscope is manually caged and turned through an angle and is kept caged. The associated wiper is thus set at a particular point on the directional-gyroscope potentiometer which then supplies a constant heading-departure control signal to the appropriate relay whereupon the craft banks and turns, the bank-angle control signal coming into play to oppose the heading-departure control signal as in the case of a set change of heading, and the craft continues to turn until the directional gyroscope is freed and the wiper returns to its zero position on the potentiometer.

These desirable results can be achieved by the invention in other embodiments in which a change to a new heading can be set by means other than caging and forcibly turning the gyroscope. For example in Fig. 3 there is shown a system in which the heading of the craft is controlled from a gyroscope whose absolute direction is controlled, e. g. by means of control excited from a magnetic compass 80, as shown and more fully described in U. S. Patent 2,357,319 to O. E. Esval et al. for Flux Valve Magnetic Compass, issued September 5, 1944, a pick-off potentiometer 70 which may be similar to that described above may be associated with the gyroscope 1, but the potentiometer winding 71 instead of being fixed to the outer casing of the gyroscope may be carried on a member 72 which is rotatable about the vertical axis of the gyroscope 1. A heading-setting knob 73 may then be provided to adjust the angular position of the potentiometer winding 71 in the instrument casing which is fixed to the craft. This angular position determines the heading that will be maintained by the control system. Turns of the craft may be produced by turning the knob 73 and hence the winding 71 through a desired angle. Of course, in this modification the caging and setting mechanism associated with the gyroscope 1 of Fig. 1 may be omitted.

The actual rate of turn at which turns exceeding 30° are carried out can be altered by suitably varying the ratio between the voltage applied to the bank-angle control-signal potentiometer and the voltage applied to the heading-departure control-signal potentiometer. An adjustment may be provided for varying this ratio. For this purpose the two potentiometers may be supplied from the same source and the ratio between their voltages may be altered by cutting in or out by wiper 74 resistances 75 in series with the bank-angle control-signal potentiometer 27.

What is claimed is:

1. An automatic pilot for aircraft having roll-controlling surfaces, a servomotor for operating said surfaces and signal responsive means for controlling said servomotor, means for providing a first signal dependent upon a desired course change of the craft from a given heading, said first signal providing means including means for providing a proportional increase of said first signal with an increase in the magnitude of desired course changes set in up to a predetermined value and means for maintaining said signal substantially constant for course changes set in in excess of said predetermined value, means for providing a second signal dependent upon the angle of bank of said craft, means for supplying said first signal to said signal responsive means in a sense to cause the craft to bank and turn towards the desired course, and means for supplying said second signal to said signal responsive means in such sense as to oppose said first signal.

2. An automatic pilot as claimed in claim 1 including further means for providing a feed-back signal in dependence on deflection of the roll-controlling surfaces connected to supply the feed-back signal to the control means for the servo-motor.

3. An automatic pilot for aircraft having roll-controlling surfaces, servo-means, including a servo-motor and servo-motor control means, for actuating the roll-controlling surfaces of the craft in response to a resultant control signal to cause the craft to roll in one direction or the other according to the sense of the resultant control signal, means for providing a heading-departure signal measuring departure of the craft's heading from a predetermined heading said heading-departure signal increasing progressively with departure of the craft from the predetermined heading up to a predetermined limit but remaining substantially constant for departure in excess of the predetermined limit to substantially 180°, means for providing a bank-angle signal measuring the angle of bank of the craft, and means for combining the heading-departure and the bank-angle signals to provide the resultant control signal, the heading departure signal being supplied in the sense to cause the craft to bank and turn towards the predetermined heading on departure therefrom and the bank angle signal being supplied in the sense to eliminate the said banking of the craft.

4. An automatic pilot for aircraft having roll-controlling surfaces, servo-means, including a servo-motor and servo-motor-control means, for controlling the roll-controlling surfaces of the craft in response to a resultant control signal to cause the craft to roll in one direction or the other according to the sense of the resultant control signal, means for providing a heading-departure signal measuring departure of the craft's heading from a predetermined heading said heading-departure signal increasing progressively with departure of the craft from the predetermined heading up to a predetermined limit but remaining substantially constant for departure in excess of the predetermined limit, means for providing a bank-angle signal measuring the angle of bank of the craft, means for combining the heading-departure and the bank-angle signals to provide the resultant control signal, the heading-departure signal being supplied in the sense to cause the craft to bank and turn towards the predetermined heading on departure therefrom and the bank-angle signal being supplied in the sense to eliminate the said banking of the craft, and means for setting the heading-departure-signal-producing means so that the predetermined heading may have a desired direction.

5. An automatic pilot as in claim 4 including further means for providing a feed-back signal in dependence on deflection of the roll-controlling surfaces connected to supply the feed-back signal to the control means for the servo-motor.

6. An automatic pilot for aircraft having roll-controlling surfaces, servo-means, including a servo-motor and servo-motor-control means for controlling the roll-controlling surfaces of the craft in response to a resultant control signal to cause the craft to roll in one direction or the other according to the sense of the resultant control signal, a directional gyroscope, a potentiometer pick-off associated with the said gyroscope having a winding extending through a predetermined angle on each side of its centre-point and thereafter continued up to substantially 180° by a strip of low-resistance and so connected to the gyroscope that relative movement of the outer gimbal-frame and the craft produces relative movement of the wiper and the winding of said potentiometer, a source of energy for said potentiometer connected to said strips, means for providing a bank-angle signal measuring the angle of bank of the craft, means for combining the potential of the wiper and the bank-angle signal to provide the resultant control signal, said potential being supplied in the sense to cause the craft to bank and turn towards the predetermined heading on departure therefrom, and the bank-angle signal being supplied in the sense to eliminate the said banking of the craft and means for applying the resultant signal to the control means.

7. An automatic pilot as in claim 6, further including means for providing a feed-back signal in dependence on deflection of the roll-controlling surfaces connected to supply the feed-back signal to the control means for the servo-motor.

8. An automatic pilot for aircraft having roll-controlling surfaces, servo-means, including a servo-motor and servo-motor-control means, for controlling the roll-controlling surfaces of the craft in response to a resultant control signal to cause the craft to roll in one direction or the other according to the sense of the resultant control signal, a directional gyroscope, a potentiometer pick-off associated with the gyroscope having a winding extending through a predetermined angle on each side of its centre-point and thereafter continued up to substantially 180° by a strip of low-resistance and so connected to the gyroscope that relative movement of the outer gimbal-frame and the craft produces relative movement of the wiper and the winding of said potentiometer, a source of energy for said potentiometer connected to said strips, means for providing a bank-angle signal measuring the angle of bank of the craft, means for combining the said potential and the bank-angle signal to provide the resultant control signal, the heading departure signal being supplied in the sense to cause the craft to bank and turn towards the predetermined heading on departure therefrom, the bank angle signal being supplied in the sense to eliminate the said banking of the craft, means for applying the resultant signal to the control means and means for setting the heading to be maintained by the automatic pilot, said means operating to change the relationship between the gyroscope, the aircraft, the potentiometer winding and the wiper so that the wiper is centred on the winding when the aircraft is headed in a new direction with relation to the gyroscope determined by the adjustment of the setting means.

9. An automatic pilot as in claim 8 further including means for providing a feed-back signal in dependence on deflection of the roll-controlling surfaces connected to supply the feed-back signal to the control means for the servo-motor.

10. An automatic pilot for aircraft having roll-controlling surfaces, servo-means, including a servo-motor and servo-motor control means, for controlling the roll-controlling surfaces of the craft in response to a resultant control signal to cause the craft to roll in one direction or the other according to the sense of the resultant control signal, a directional gyroscope, a potentiometer pick-off associated with the gyroscope having a winding extending through a predetermined angle on each side of its centre-point and thereafter continued up to substantially 180° by a strip of low-resistance and so connected to the gyroscope that relative movement of the outer gimbal-frame and the craft produces relative movement of the wiper and the winding of said potentiometer, a source of energy for said potentiometer connected to said strips, means for providing a bank-angle signal measuring the angle of bank of the craft, means for combining the said potential and the bank-angle signal to provide the resultant control signal, the heading departure signal being supplied in the sense to cause the craft to bank and turn towards the predetermined heading on departure therefrom, the bank angle signal being supplied in the sense to eliminate the said banking of the craft, means for applying the resultant control signal to the control means and means for caging or locking and turning the directional-gyroscope through any desired angle.

11. An automatic pilot for aircraft having roll-controlling surfaces, servo-means including a servo-motor and servo-motor-control means for controlling the roll-controlling surfaces of the craft in response to a resultant control signal to cause the craft to roll in one direction or the other according to the sense of the resultant control signal, a directional gyroscope, a potentiometer pick-off associated with the gyroscope having a winding extending through a predetermined angle on each side of its centre-point and thereafter continued up to substantially 180° by a strip of low-resistance, and so connected to the gyroscope that relative movement of the outer gimbal-frame and the craft produces relative movement of the wiper and the winding of said potentiometer, a source of energy for said potentiometer connected to said strips, means for providing a bank-angle signal measuring the angle of bank of the craft, means for combining the potentiometer output and the bank-angle signal to provide the resultant control signal, the heading departure signal being supplied in the sense to cause the craft to bank and turn towards the predetermined heading on departure therefrom and the bank angle signal being supplied in the sense to eliminate the said banking of the craft, means for caging or locking and turning the directional gyroscope through any desired angle, and means for maintaining the gyroscope caged, or for freeing it as desired, after turning it through a desired angle.

12. An automatic pilot as in claim 10 including further means for providing a feed-back signal in dependence on deflection of the roll-controlling surfaces connected to supply the feed-back signal to the control means for the servo-motor.

13. An automatic pilot for aircraft having roll-controlling surfaces, a servomotor for operating said surfaces and signal responsive means for controlling said servomotor, a directional gyroscope, means associated with said directional gyroscope for producing a first azimuth control signal dependent upon relative azimuthal movement between said directional gyroscope and the craft on which it may be mounted, a vertical gyroscope, means associated with said vertical gyroscope for producing a second control signal dependent upon the angle of bank of said craft, means for caging and rotating said directional gyro in azimuth, means for algebraically combining said first and second signals, and means for supplying the combined signals to said signal responsive means.

14. An automatic pilot as in claim 13 including further means for providing a feed-back signal in dependence on deflection of the roll-controlling surfaces connected to supply the feed-back signal to the control means for the servo-motor.

15. An automatic pilot for aircraft having roll-controlling surfaces, servo-means, including a servo-motor and servo-motor-control means, for controlling the roll-controlling surfaces of the craft in response to a resultant control signal to cause the craft to roll in one direction or the other according to the sense of the resultant control signal, a directional-gyroscope, a potentiometer pick-off associated with the directional-gyroscope having a winding extending through a predetermined angle on each side of the centre-point and thereafter continued up to substantially 180° by a strip of low resistance, and so connected to the directional gyroscope that relative movement of the outer gimbal-frame and the craft produces relative movement of the wiper and the winding of said potentiometer, a source of energization for said directional gyroscope potentiometer, a gyro-vertical, a potentiometer having its wiper rotatable in correspondence with rotation of the outer gimbal-frame of the gyro-vertical, a source for energising said gyro-vertical potentiometer, the energization of the two potentiometers being so arranged that the centre-points are at the same potential, means for combining the heading-departure and the bank-angle signals respectively provided by the said wipers to provide the resultant control signal, the heading-departure signal being supplied in the sense to cause the craft to bank and turn towards the predetermined heading on departure therefrom and the bank-angle signal being supplied in the sense to eliminate the said banking of the craft.

16. An automatic pilot as in claim 15, including further means for providing a feed-back signal in dependence on deflection of the roll-controlling surfaces connected to supply the feed-back signal to the control means for the servo-motor.

17. An automatic pilot for aircraft having roll-controlling surfaces, servo-means, including a servo-motor and servo-motor-control means, for controlling the roll-controlling surfaces of the craft in response to a resultant control signal to cause the craft to roll in one direction or the other according to the sense of the resultant control signal, a directional-gyroscope, a potentiometer associated with said directional gyroscope having a winding extending through a predetermined angle on each side of the centre-point and thereafter continued up to substantially 180° by a strip of low resistance, and so connected to the directional gyroscope that relative movement of the outer gimbal-frame and the craft produces relative movement of the wiper and the winding of said potentiometer, a source for energizing said directional gyroscope potentiometer, a gyro-vertical, a potentiometer associated with said gyro-vertical having its wiper rotated in correspondence with rotation of the outer gimbal-frame of the gyro-vertical a source for energizing said gyro-vertical potentiometer, the energization of the two potentiometers being so arranged that the centre-points are at the same potential, and means for combining the heading-departure and the bank-angle signals respectively provided by the said potentiometers to provide the resultant control signal, the heading-departure being supplied in the sense to cause the craft to bank and turn towards the predetermined heading on departure therefrom and the bank-angle signal being supplied in the sense to eliminate the said banking of the craft, means for setting the directional gyroscope and its pick-off so as to provide a measure of departure of the craft from a desired predetermined direction.

18. An automatic pilot as in claim 17, including further means for providing a feed-back signal in dependence on deflection of the roll-controlling surfaces connected to supply the feed-back signal to the control means for the servo-motor.

19. An automatic pilot for aircraft having roll-controlling surfaces, servo-means including a servo-motor and servo-motor control means for controlling the roll-controlling surfaces of the craft in response to a resultant control signal to cause the craft to roll in one direction or the other according to the sense of the resultant control signal, a directional-gyroscope, a potentiometer associated with said directional gyroscope having a winding extending through a predetermined angle on each side of the centre-point and thereafter continued up to substantially 180° by a strip of low resistance, and so connected to the gyroscope that relative movement of the outer gimbal-frame and the craft produces relative movement of the wiper and the winding of said potentiometer, a source for energizing said directional gyroscope potentiometer, a gyro-vertical, a potentiometer associated with said gyro-vertical having its wiper rotated in correspondence with rotation of the outer gimbal-frame of the gyro-vertical, a source for energizing said gyro-vertical potentiometer, the energization of the two potentiometers being so arranged that the centre-points are at the same potential, and means for combining the heading departure and the bank-angle signals respectively provided by the said potentiometers to provide the resultant control signal, the heading-departure signal being supplied in the sense to cause the craft to bank and turn towards the predetermined heading on departure therefrom, and the bank-angle signal being supplied in the sense to eliminate the said banking of the craft, and means for caging or locking and turning the directional gyroscope through any desired angle.

20. An automatic pilot for aircraft having roll-controlling surfaces, servo-means, including a servo-motor and servo-motor-control means, for controlling the roll-controlling surfaces of the craft in response to a resultant control signal to cause the craft to roll in one direction or the other according to the sense of the resultant control signal, a directional-gyroscope, a potentiometer associated with said directional-gyroscope having a winding extending through a predetermined angle on each side of the centre-point and thereafter continued up to substantially 180° by a strip of low resistance and so connected to the gyroscope that relative movement of the outer gimbal-frame and the craft produces relative movement of the wiper and the winding of said potentiometer, a source for energizing said directional gyroscope potentiometer, a gyro-vertical, a potentiometer associated with said gyro-vertical having its wiper rotated in correspondence with rotation of the outer gimbal-frame of the gyro-vertical and means for combining the heading departure and the bank-angle signals respectively provided by the said potentiometers to provide the resultant control signal, the heading departure signal being supplied in the sense to cause the craft to bank and turn towards the predetermined heading on departure therefrom and the bank angle signal being supplied in the sense to eliminate the said banking of the craft, means for caging or locking and turning the directional gyroscope through any desired angle, and means for maintaining the directional gyroscope caged or for freeing it as desired, after turning it through a desired angle.

21. An automatic pilot as in claim 19 including further means for providing a feed-back signal in dependence on deflection of the roll-controlling surfaces connected to supply the feed-back signal to the control means for the servo-motor.

22. An automatic pilot as in claim 21 including further means for providing a feed-back signal in dependence on deflection of the roll-controlling surfaces connected to supply the feed-back signal to the control means for the servo-motor.

23. An automatic pilot for aircraft having roll-controlling surfaces, servo-means, including a servo-motor and servo-motor-control means for controlling the roll-controlling surfaces of the craft in response to a resultant control signal to cause the craft to roll in one direction or the other according to the sense of the resultant control signal, means for providing an electrical heading-departure signal measuring departure of the craft's heading from a predetermined heading, said heading-departure signal increasing progressively with departure of the craft from the predetermined heading up to a predetermined limit but remaining substantially constant for departure in excess of the predetermined limit to substantially 180°, means for providing an electrical bank-angle signal measuring the angle of bank of the craft, a polarised relay for combining the heading departure and the bank-angle signals to provide the resultant control signal applied to the servo-motor-control means, the heading departure signal being supplied to a coil of the relay in the sense to cause the craft to bank and turn towards the predetermined heading on departure therefrom and the bank angle signal being supplied to a coil of the relay in the sense to eliminate the said banking of the craft, and a source for polarising the relay.

24. An automatic pilot for aircraft having roll-controlling surfaces, a servomotor for operating said surfaces and signal responsive means for controlling said servomotor, a directional gyroscope, means comprising a pick-off associated with said gyroscope for providing a first or heading signal, one element thereof being connected to rotate with said gyroscope and the other element thereof being rotatably mounted on said craft, means for rotating one of said rotatable elements through an angle proportional to a desired course change of the craft from a given heading, means for providing a second signal dependent upon the angle of bank of said craft, means for supplying said first signal to said signal responsive means in a sense to cause the craft to bank and turn towards the desired course, and means for also supplying said second signal to said signal responsive means in such sense as to oppose said first signal.

ARTHUR PHILIP GLENNY.

REFERENCES CITED

The following references are of record in the file of this patent:

UNITED STATES PATENTS

| Number | Name | Date |
|---|---|---|
| 1,869,840 | Boykow | Aug. 2, 1932 |
| 1,958,258 | Alexanderson | May 8, 1934 |
| 2,190,390 | Thiry | Feb. 13, 1940 |
| 2,197,898 | Roland et al. | Apr. 23, 1940 |
| 2,419,979 | Wilson | May 6, 1947 |
| 2,498,064 | Borell | Feb. 21, 1950 |